May 16, 1967  B. J. WARMAN ET AL  3,320,487
MODULAR ELECTRICAL ASSEMBLIES
Filed March 8, 1965  6 Sheets-Sheet 3

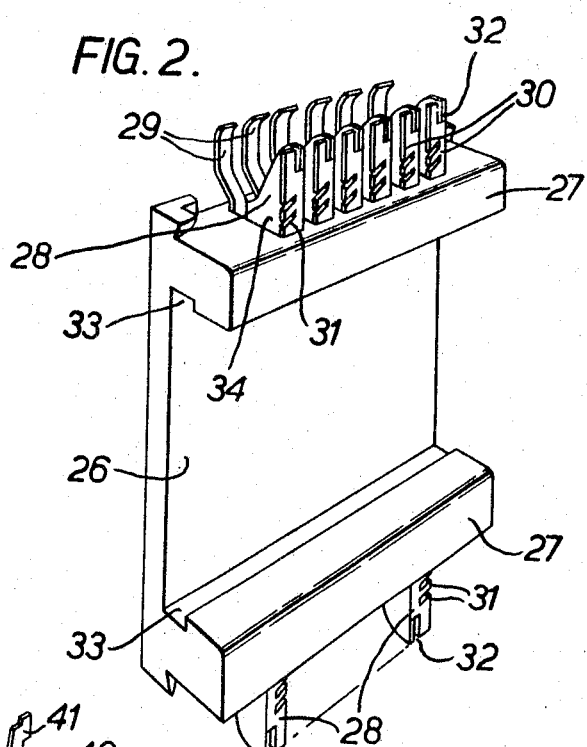
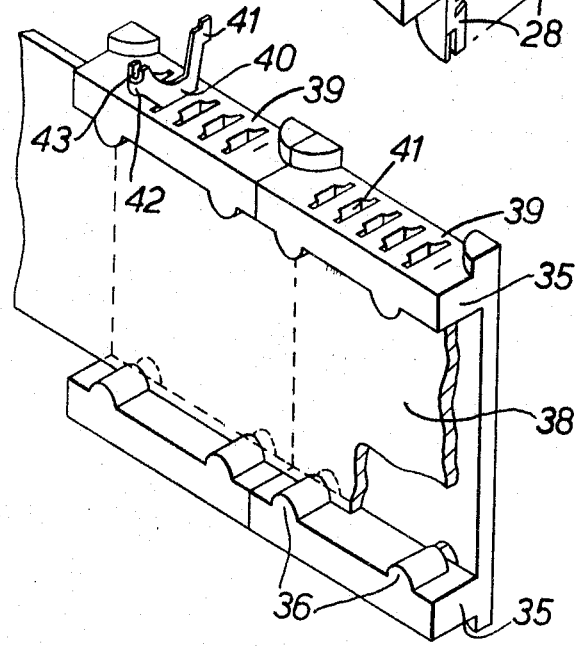

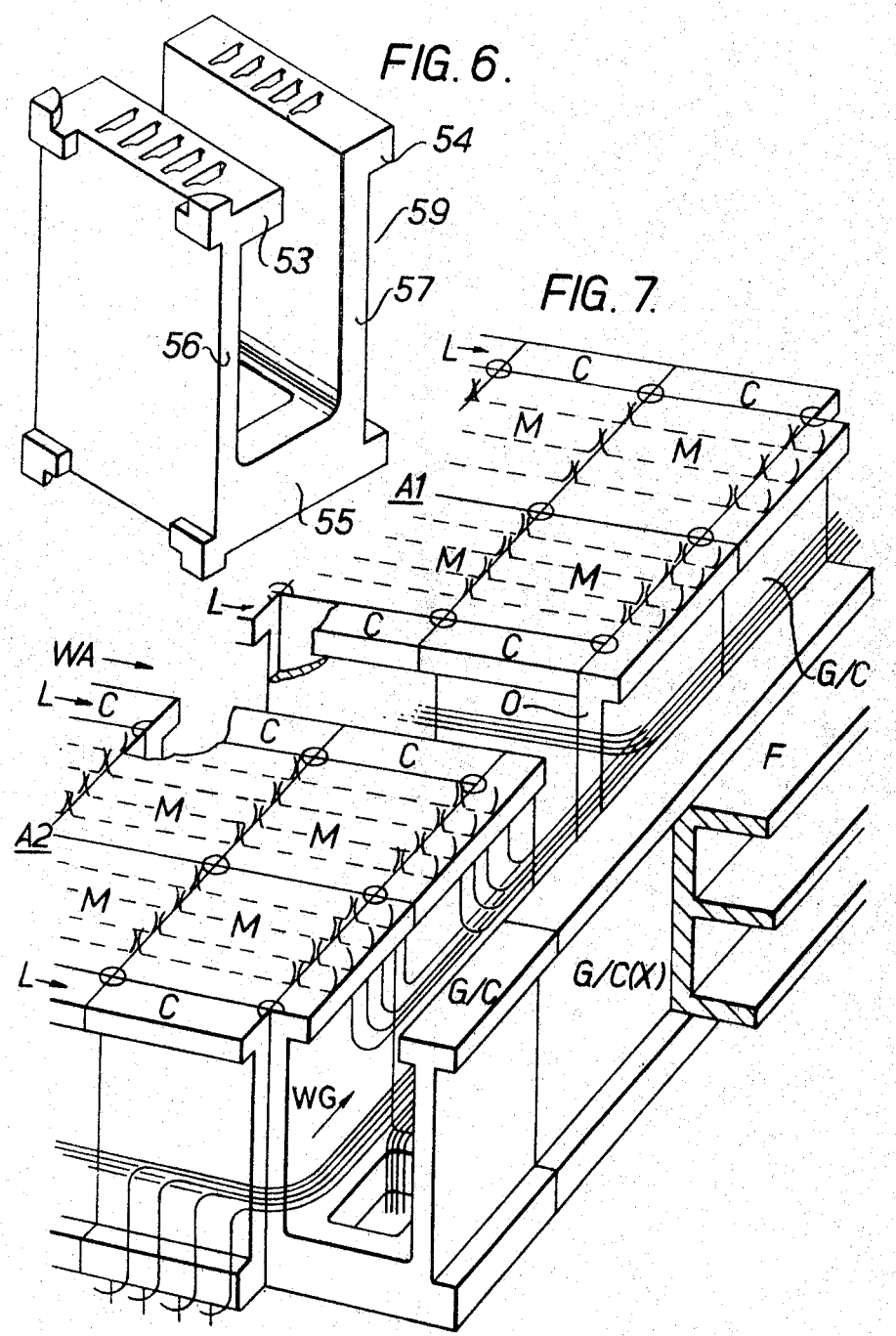

United States Patent Office 3,320,487
Patented May 16, 1967

3,320,487
MODULAR ELECTRICAL ASSEMBLIES
Bloomfield James Warman, London, and Raymond John Frederick Derbyshire, Welling, England, assignors to Associated Electrical Industries Limited, London, England, a British company
Filed Mar. 8, 1965, Ser. No. 437,679
Claims priority, application Great Britain, Mar. 11, 1964, 10,292/64
12 Claims. (Cl. 317—101)

This invention relates to border members for modular assemblies of electric circuit elements, by which is meant assemblies in which the circuit elements are provided in sub-units each comprising one or more of the elements within a modular volume defined by a containing structure for the elements, the sub-units being arranged in one or more rows in which the individual modular volumes lie in side-by-side juxtaposition. In particular the invention is concerned with such assemblies in which, in each row, conductive members having connections thereto from the circuit elements extend across the ends of the individual modular volumes at one or both ends thereof in a manner extending said connections to a side- or end-edge of the row and thus to an edge of the assembly.

According to the present invention there is provided in combination, a plurality of electric circuit modules assembled together as a modular assembly between two parallel planes, and border terminating members assembled along an edge of said assembly, in which combination: the circuit modules have respective end faces in one of said planes; the circuit modules defining said edge of the assembly have respective sets of connection tags extending outwardly from the plane of their said end faces and standing proud on said edge; the assembly has electrical connections extending from the circuit modules thereof to said connection tags of the edge circuit modules; the border terminating members also have respective end faces in said one plane; and each border member has a set of terminal members thereon comprising respective connection tag portions extending outwardly from said one plane into mutual engagement with the said connection tags of the adjacent edge circuit modules, and respective terminal portions connected to but spaced from the connection tag portions.

Various forms of border terminating member can be provided in accordance with the invention in combination with a modular assembly wherein the circuit modules are of the kind comprising, as described in copending U.S. application Ser. No. 359,345, a modularly dimensioned containing structure having at one or each end thereof an end face through which terminal members from the contained circuit elements extend into connection with conductors extending across the end face from their positions of connections with said terminal members to positions adjacent opposite edges of the end face, at which latter positions these conductors have tag portions extending outwardly of the end face in a direction transverse thereto. A number of such modules can be assembled side-by-side in a row with their terminal members orientated either transversely of the row, so that the tag portions of the end face conductors lie at opposite edges of the row, or along the row with the end face conductors of adjacent modules lying in alignment and interconnected by mutual engagement between their tag portions at the adjacent edges of the modules: in the latter case the interconnected aligned conductors constitute connecting multiples extending along the row of modules between the extreme ends thereof. Several rows of modules may lie side-by-side with corresponding modules from the several rows in transverse alignment, giving a co-ordinate matrix arrangement in which the modules lie in rows along one ordinate and columns along the other ordinate. If end face conductors are then provided at both ends of each module in the manner indicated, these conductors at one end may be orientated orthogonally with respect to their orientation at the other end, so that they lie in alignment along the rows across one face of the complete assembly and along the columns across the other face of the assembly: the interconnected end face conductors at opposite faces of the complete assembly then constitute co-ordinately related multiples.

While the foregoing application of the present invention is considered to be the more important, it is to be understood that the invention may also be realized in a combination including modular assemblies in which a plurality of sub-units are contained in respective cells of modular valume defined row-wise in a single containing structure of honeycomb or egg box form with multipling conductors, for instance of strip or ribbon form, extending across one or both of the two opposite faces of the structure to the ends of the rows.

In the drawings:

FIGS. 2 and 3 illustrate alternative forms of channel section border member;

FIGS. 4 and 5 illustrate one form of gutter forming border member while FIG. 6 illustrates an alternative form;

FIGS. 7 and 8 illustrate further arrangements utilising border members of different forms in conjunction with a number of module assemblies.

Figure 1:
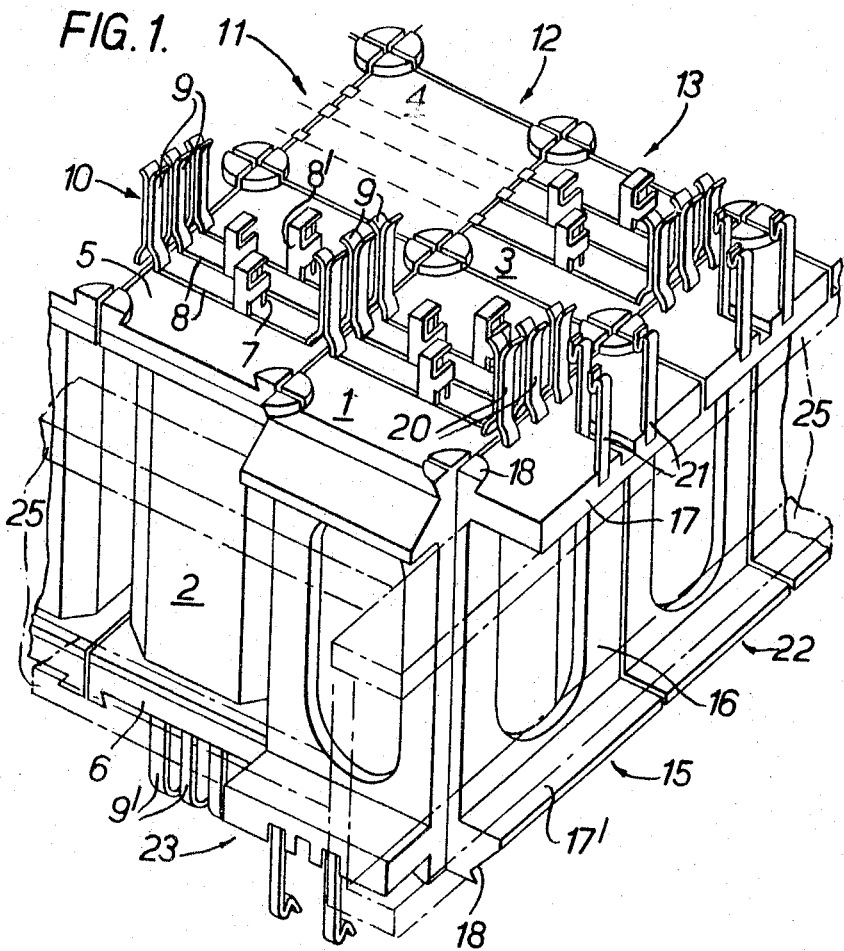
FIG. 1 illustrates one form of channel section border member shown used in conjunction with a matrix assembly of circuit modules.

Referring firstly to FIG. 1, there is illustrated a module assembly comprising a plurality of electric circuit modules 1, 2, 3, 4 . . . arranged in a rectangular matrix. These modules for instance may be constituted by reed relay units or may contain sub-assemblies of components constituting some form of sub-circuit such as electronic amplifiers or gating circuits. In each module, taking module 2 as typical, the constituent electrical components are contained between end faces 5 and 6 through which project terminal portions such as 7 from these components. Conductors 8, having connecting portions 8' extending alongside the terminal portions 7 and connected to them as by soldering, extend therefrom to opposite edges of the end face 5 or 6 (as the case may be) and are there formed with tag portions 9, 9' extending outwardly from the plane of the end face. Depending on the connections required to and between the modules, for instance if the several modules are to be connected at respective cross-points of a co-ordinate connection scheme, the conductors 8 at one face of the assembly may be orthogonally orientated with respect to those at the other face so that, as indicated, the tag portions 9 of the conductors 8 at one face are at different edges of the module 2 than are the tag portions 9' at the other face. The major surfaces of the tag portions 9, 9' lie parallel to the module edge. As a modification however the tag portions may have a form such as that shown at 9a in FIG. 1a, in which the tag portions 9a have their major surfaces normal to the edge and overhang the edge towards their outer extremities.

Figure 1A:
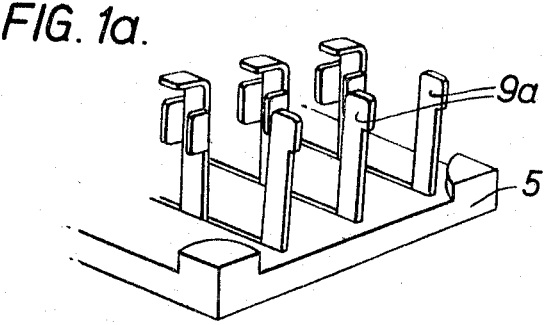
FIG. 1a illustrates a modified form for the tag portions of the end face conductors on the modules in FIG. 1.

The modules are assembled together in their matrix so that at one face (the upper face in FIGURE 1) the tag portions 9 at the adjacent edges of adjacent modules in parallel rows such as 10 and 11 are in abutting juxtaposition, or overlapping juxtaposition if the tag portions are of the form shown in FIG. 1a, while at the other face (the lower face in FIG. 1) the tag portions 9' at the adjacent edges of adjacent modules in transverse rows (columns) such as 12 and 13 are likewise juxtaposed. Consequently by connecting together the juxtaposed tag portions, again as by soldering for instance, the conductors such as 8 become connected together into connecting multplies extending across the assembly, the multiples at one side being co-ordinately related to those at the other if the conductors 8 are orthogonally orientated as previously mentioned. The end faces 5 and 6 of the modules are shown as having quadrantal projections such as 14 at each corner. At each junction between four modules these projections together form a circle and can be held together by an embracing clip (not shown) so as to hold the modules in their assembly.

To terminate the multiples formed by the interconnected conductors 8 along row 10, a border member 15 is assembled against the end edge of this row, namely against the outer side of the end module 1 in this row. This border member 15 is of channel section defined by a side portion 16 and two transverse end portions 17 and 17'. The length of this member is the same as that of the modules, between their end faces, so that at the outer faces of the portions 17 and 17' the member 15 forms continuations of the end faces of the module 1. Quadrantal projections 18 on the member 15 permit it to be assembled to the module 1 in the same way as the modules themselves are assembled together.

The end portion 17 of the member 15 carries conductors comprising edge tag portions 20 and wiring terminal portions 21 both projecting from the outer face of this end portion 17. The tag portions 20 have basically the same form as those on the modules: consequently if the module tag portions had the modified form shown in FIG. 1a the tag portions 20 would be similarly modified. With the member 15 assembled to the module 1 the tag portions 20 lie in juxtaposition to the tag portions 9 at the adjacent edge of this module and can therefore be connected to them in the same manner as for the juxtaposed tag portions 9 in the module assembly itself. Wiring connections can then be made at the terminals 21 to the multiples formed by the interconnected conductors 8 across the assembly. In the same manner similar border members can be assembled to the module assembly at the ends of the other rows of modules parallel to row 10, as indicated at 22 for row 11. There will then be a line of these border members along this edge of the module assembly.

To permit wiring connection to the multiples formed across the end faces 6 of the modules, a line of border members such as 23 can likewise be assembled along the orthogonal edge of the module assembly at the ends of the rows such as 13. These border members, identical to those such as 15 but reversed in relation thereto, have the tag portions of their conductors (of which only the wiring terminal portions 21 can be seen in the drawing) connected as before to the juxtaposed tag portions 9' of the modules at this edge of the assembly.

The external channel section presented by the border members 15 can be used for mounting the module assembly as a whole in a frame or rack as indicated in chain-dotted lines at 25.

In the form of channel-section border member shown in FIG. 2 the side portion 26 has similar end portions 27 at both ends and both of these carry tag members 28 so as to be able to terminate connections extending across both faces of the module assembly to the same side thereof (rather than to different sides as shown for the assembly in FIG. 1). These tag members 28 are modified in form as compared with those in FIG. 1. Their tag portions 29 are similar to those on the modules (they are shown as having the FIG. 1 form but could equally have the FIG. 1a form) but their terminal portions 30 are bent through a right angle at their edges near the outer edge of the end portions 27 and the resulting arms are slotted and notched as indicated at 31 and 32 respectively. To make connection to such tag member the bared end of a wire can be passed through one of the slots 31 and then brought back through the notch 32 and pull tight, being thereby firmly retained in position for subsequent soldering. The inner faces of the end portions 27 of the border member of FIG. 2 are formed with channels 33. This permits a strengthening strip or plate to be slid along these channels (rather in the manner illustrated in FIG. 3 for another form of border member) in order to impart greater rigidity to the border member: in this as in all other forms herein described the border member is assumed constituted by a plastics moulding. Such a strengthening plate or strip can also serve to assemble a number of the border members together in a line in the absence of the module assembly, thereby permitting these border members to be wired independently: this mode of assembly is also illustrated in FIG. 3. The tag members 28 heat-sealed or otherwise retained in slots 34 in the outer faces of the end portions 27.

FIG. 3 illustrates another form of channel section border member in which the inner faces of the end portions 35 are formed with semi-cylindrical protuberances 36 spaced from the adjacent surface of the side portion 37 by a distance sufficient to accept the width of a strengthening or mounting member 38. This is shown carrying two border members 39. FIG. 3 also shows another form of tag member 40, of which only one is shown but others would be inserted and retained in slots such as 41 provided for them in the end portions 35. The tag member 40 (shown this time with its tag portion 41 in the form compatible with FIG. 1a) has its terminal portion 42 formed by bending round the tail of the tag member and notching it as at 43. A wire can then be brought up behind this notch and then pulled down through it so as to become retained by it prior to soldering.

Figure 4:
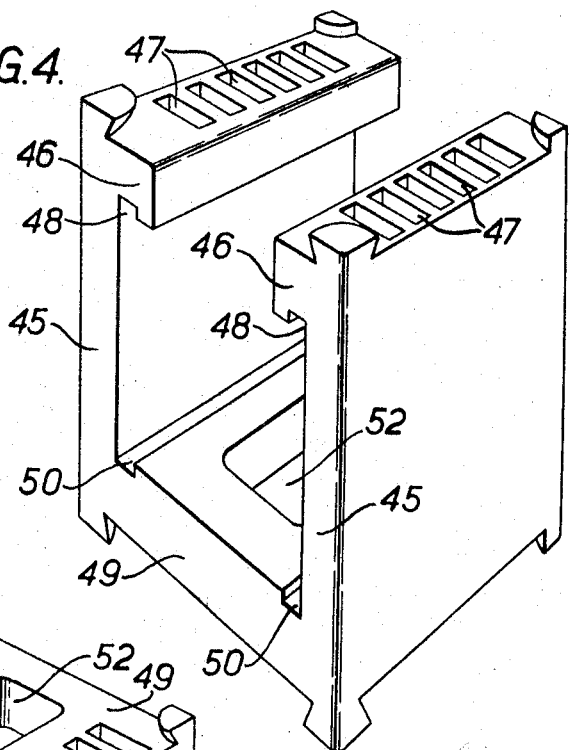
Figure 5:
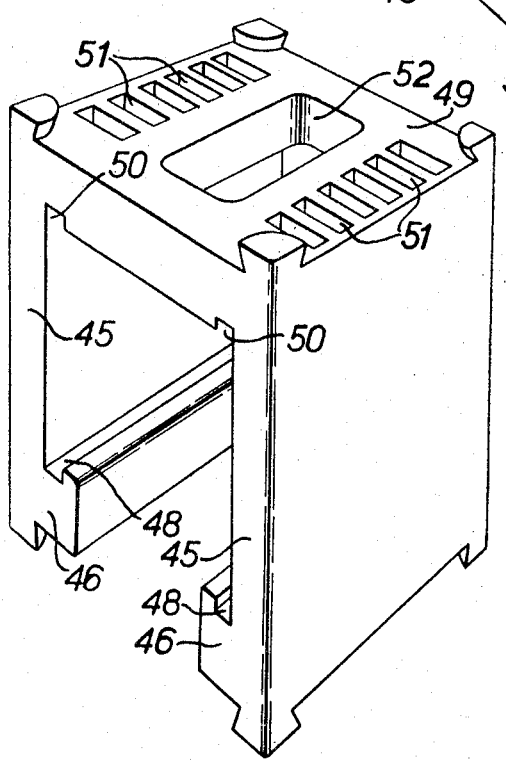

Turning now to the gutter forming form of border member, the form shown in FIGS. 4 and 5 (the latter being an inverted view of the former) will be seen to have a family resemblance to the channel section border member of FIG. 2 in that each of its two side portions 45 have respective end portions 46 which are slotted on their outer faces (at 47) to receive tag members (omitted from the drawing for convenience and clarity) and are channelled on their inner faces (at 48) to receive strengthening or mounting members as before. At the other end of the side portions 45 are joined by an integral end portion 49 the inner face of which is likewise channelled at 50. The outer face of the end portion 49 is shown as having slots 51 in which further tag members can be provided if so required. This is an optional feature and enables connections to be terminated at the gutter on both faces of the associated module assembly. An opening 52 in the end portion 49 gives wiring access from the inside of the gutter to tag members accommodated in the slots 51.

The form of gutter-forming border member shown in FIG. 6 has transverse end portions 53 and 54 which are again sloted to take terminal tag members, as may also be the outer (hidden) face of the end portion 55 joining the two side portions 56, 57. In this case however the end portion 54 extends outwardly and defines, in conjunction with an outwardly extending portion 58 at the other end, an external mounting channel 59 on the outside of the side member 57.

Figure 8:
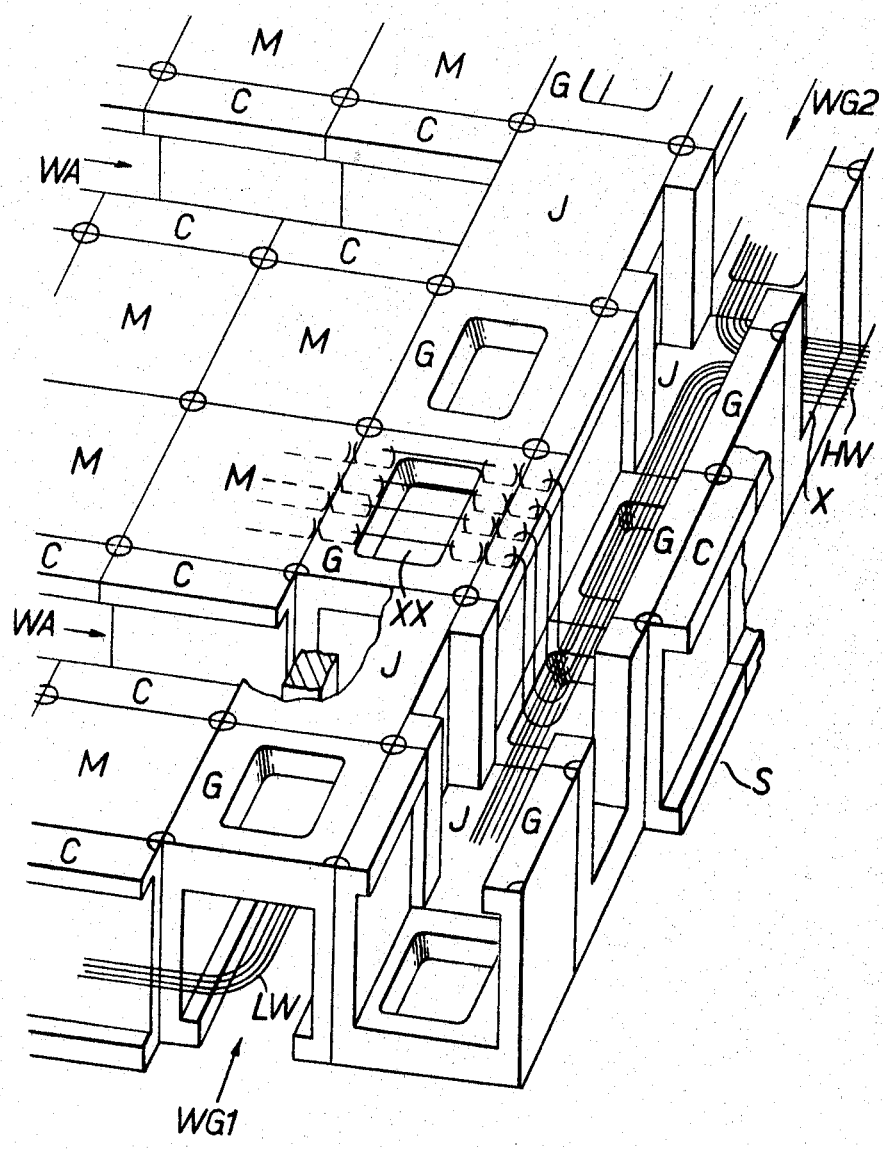

Further modes of using the different forms of border member in conjunction with a number of module assemblies are shown ni FIGS. 7 and 8. In both of these figures, which are only intended to be schematic, different parts of the assembly are denoted by letters according to their natures. Thus M indicates a module, C indicates a channel section border member, G indicates a gutter forming border member, F indicates a support frame (in FIG. 7 only), and J indicates a special form of moulding for use at "cross roads" in the overall assembly.

In FIG. 7 two matrix assemblies A1 and A2 of modules M are bordered along opposite edges by lines L of channel section border members C. The adjacent edges of the two assemblies are modularly spaced and the two lines of border members C along these edges define between them a wiring aisle WA. Along the end edges of the assemblies A1 and A2 a wiring gutter WG is formed by means of gutter forming border members G/C and G/C(X) the outer sides of which are of channel section (as in FIG. 6) and engage with a side member of a support frame F. It is contemplated that such a wiring gutter may be formed along all four sides of a complete assembly mounted in a single surrounding frame, thereby providing convenient wiring accommodation with easy access to the modules. In FIG. 7 the part G/C(X) represents a gutter forming border member of multiple modular width which can be provided especially for runs of gutter crossing the end of a wiring aisle: it will be noted that this gutter member G/C(X) is formed in one side with an opening O which lies in line with the wiring aisle WA and gives wiring access between it and the wiring gutter WG.

In FIG. 8 gutter forming border members G are arranged in two lines along the end edges of the module assemblies so as to provide two wiring gutters WG1 and WG2. The gutter members G are inverted in one of these lines relatively to the other so that wiring can be laid into the two gutters WG1, WG2 from opposite sides. In this case the gutters are continued across the ends of the wiring aisles WA by means of moulded members J somewhat in the form of a square table with legs at each corner. For one gutter these members J are used inverted. The spaces between the legs of these members provide a clear run for the wiring along the gutters, provide access from the gutters into the wiring aisles, and also provide side access into the gutters as indicated at X. Similar members J can also be used at intersections of wiring aisles. As the gutter members G in this FIG. 8 arrangement do not have side channel sections of their own, separate channel section border members C are assembled along their outer sides (as indicated at S) to engage with a support frame as already described. The arrangement of FIG. 8 is particularly advantageous when the modules require external wiring connections some of which are to carry direct current or low frequency alternating current (low speed wiring) while others have to convey pulses or high frequency current (high speed wiring). To minimize "cross-talk," low speed wiring (LW) can be run along the inner gutter WG1 and high speed wiring (HW), run along the outer gutter WG2, can be extended across the gutter WG1 (at right angles to the low speed wiring) by interconnecting aligned tag members provided on the blind side of the gutter members forming this latter gutter. This is schematically indicated at XX.

Figure 9:
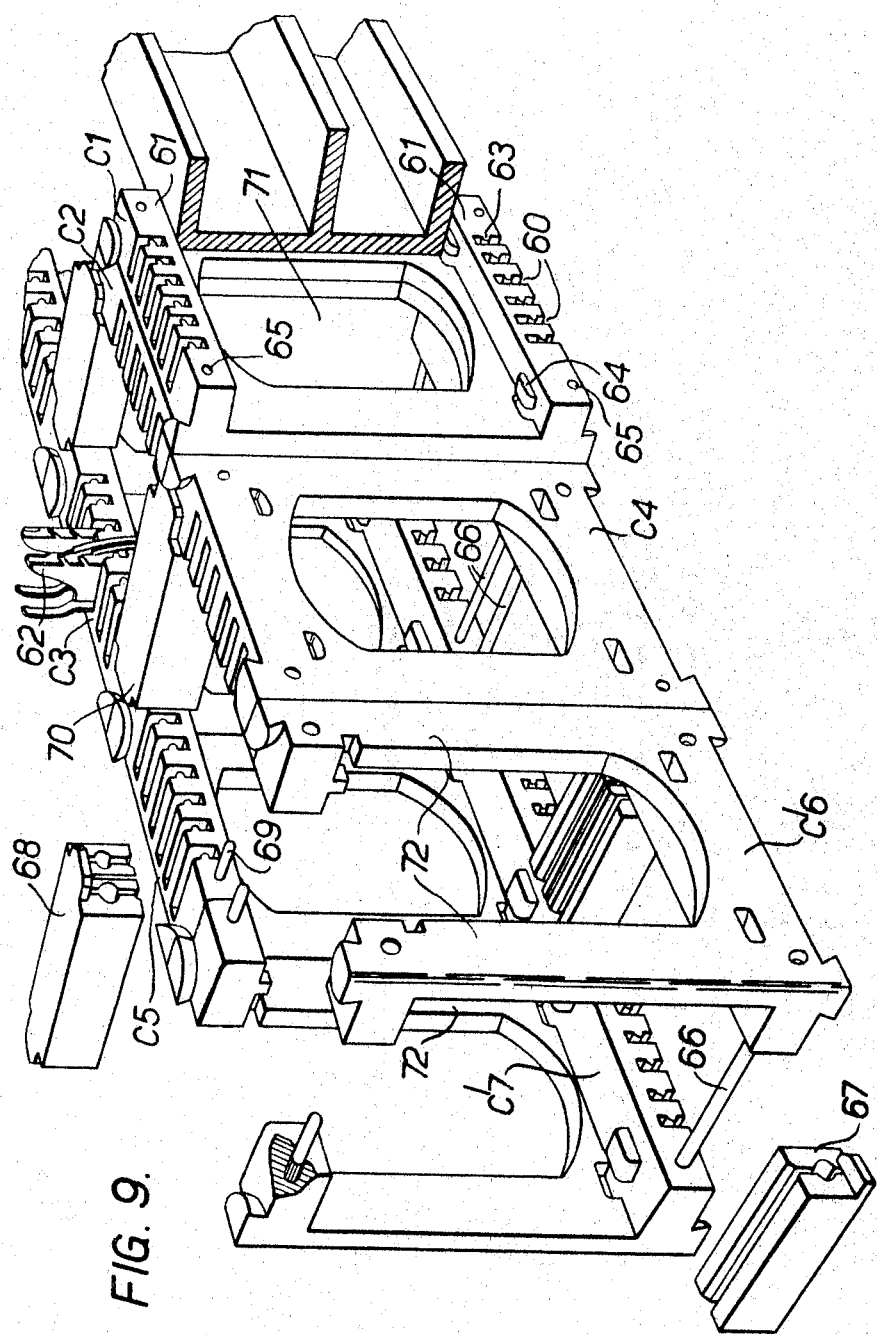
FIG. 9 illustrates the use of a single form of border member to build up a wiring gutter.

FIG. 9 illustrates the formation of a wiring gutter using channel section members which can also be used for bordering wiring aisles or engaging with a support frame. Referring to FIG. 9, each channel section member C (taking C1 as typical) is basically similar to that shown in FIG. 3 with a few modifications. In particular the tag receiving slots 60 now open to the edge of the end portions 61 of the member and receive, by sideways insertion, tag members 62 which are notched in their root portions so as to engage round retaining ledges 63 in the slots. The slots can then be heat sealed across their ends. The protrusions 64 for guiding and retaining a strengthening member when required are now more rectangular than semi-cylindrical in shape. The frontal faces of the end portions 61 are formed with holes 65 which permit gutter assembly in the manner now to be described. A pair of members, such as C4 and C5, of the form just described, are assembled into a composite gutter element by means of rods such as 66 extending between them at one end, these rods being received in the holes such as 65. Over these rods is clipped a moulded spacing piece such as 67 or 68 which by determining the spacing between the members ensures that the dimension across the composite element correctly modular. The spacing piece 67 clips over a single rod 66 at the end of a gutter: the double spacing piece 68 clips over two adjacent rods 66 belonging to adjacent gutter elements at intermediate positions and thereby assists in holding these elements together. At their other ends each pair of members such as C4 and C5 may have short pins such as 69 inserted in the holes 65. After the wiring has been laid in the gutter spacing pieces such as 67 or 68 can be clipped over these pins also as at 70. Also shown in FIG. 9 is the formation of a wiring aisle cross-roads or access entry to the wiring gutter. This is provided by two members C'6, C'7 which at one end are similar to the members C but at the other end are modified in that the openings 71 in these latter members (serving for ventilation) now extend to this end leaving the members C'6, C'7 each with two legs 72. The members C and C' can be made using the same mould with different inserts where the two forms differ. The members C'6, C'7 are assembled with rods such as 66 and spacers such as 67 or 68 as before.

What we claim is:

1. In combination, a plurality of electric circuit modules assembled together as a modular assembly between two parallel planes, and border terminating members assembled along an edge of said assembly, in which combination: the circuit modules have respective end faces in one of said planes; the circuit modules defining said edge of the assembly have respective sets of connection tags extending outwardly from the plane of their said end faces and standing proud of said edge; the assembly has electrical connections extending from the circuit modules thereof to said connection tags of the edge circuit modules; the border terminating members also have respective end faces in said one plane; and each border member has a set of terminal members thereon comprising respective connection tag portions extending outwardly from said one plane into mutual engagement with the said connection tags of the adjacent edge circuit modules, and respective terminal portions connected to but spaced from the connection tag portions.

2. The combination claimed in claim 1, wherein each border terminating member comprises an insulating support structure having a side portion of modular length and width and a transverse end portion which presents said end face and on which said set of terminal members is carried.

3. The combination claimed in claim 2, wherein at least some of the border terminating members have a second transverse end portion projecting from the side portion in the same direction as the first end portion, thereby giving these border members a channel-section shape.

4. The combination claimed in claim 3, wherein the second transverse end portion presents an end face lying in the other of said planes and carries thereon a further set of terminal members comprising respective connection tag portions extending outwardly from said other plane and standing proud of an edge thereof, which edge extends parallel to said edge on the first end face, and respective terminal portions connected to but spaced from the connection tag portions.

5. The combination claimed in claim 1, together with further border terminating members similar to the first mentioned and assembled along a second edge of said assembly transverse to the first mentioned edge, the circuit modules defining this second edge having respective sets of connection tags extending outwardly from the other of said parallel planes and standing proud of the second edge, and the connection tag portions of the further border terminating members extending outwardly from said other plane into mutual engagement with the connection tags of the second edge circuit modules, and the assembly having electrical connections, extending from the circuit modules to the connection tags of the second edge circuit modules.

6. The combination claimed in claim 3 wherein the border terminating members each have a second set of terminal members which are spaced from the first set and which comprise respective connection tag portions and terminal portions connected to but spaced from the connection tag portions, together with a second assembly of circuit modules similar to the first assembly and disposed with its edge connection tags mutually engaging the connection tag portions of the said second sets of terminal members.

7. The combination and second assembly claimed in claim 6, wherein each said support structure comprises two parallel spaced side portions each of modular length and width and a bridging transverse end portion extending between the parallel spaced portions and maintaining their spaced relationship.

8. The combination and second assembly, claimed in claim 7, wherein each parallel spaced side portion is constituted by an individual border terminating member having surfaces defined thereon and the bridging transverse end portion is constituted by joining and spacing members having surfaces defined thereon which mate with the first mentioned surfaces thereby uniting the two border members and maintaining them in their spaced relationship.

9. The combination and second assembly, claimed in claim 7, wherein the bridging transverse end portion defines an opening giving wiring access therethrough.

10. The combination claimed in claim 1, wherein the said terminal portions each comprise two integral laminar portions substantially at right angles to each other, one of said laminar portions having a wire receiving slot extending from its free edge towards the outer laminar portion with an inclination towards the outer end of these laminar portions, said outer end also having a wire receiving notch extending along and adjacent to the position where said two laminar portions meet.

11. The combination claimed in claim 1, wherein the terminal portions each comprise a laminar portion which is bent back on itself into a U-shape at a position clear of the end face of the terminating module and which has a wire receiving notch in the bend of the U.

12. The combination claimed in claim 1 wherein the border terminating members have mounting side portions extending in a direction away from said edge of the assembly for mounting on a support frame.

References Cited by the Examiner
UNITED STATES PATENTS

| | | | |
|---|---|---|---|
| 3,150,288 | 9/1964 | Flanders et al. | 317—101 |
| 3,227,926 | 1/1966 | Parstorfer et al. | 317—101 |
| 3,227,927 | 1/1966 | Parstorfer | 317—101 |

ROBERT K. SCHAEFER, *Primary Examiner.*

W. GARVERT, J. R. SCOTT, *Assistant Examiners.*